United States Patent [19]
Halliday et al.

[11] Patent Number: 5,837,655
[45] Date of Patent: *Nov. 17, 1998

[54] PURIFIED PARAFFINS AS LUBRICANTS, RATE OF PENETRATION ENHANCERS, AND SPOTTING FLUID ADDITIVES FOR WATER-BASED DRILLING FLUIDS

[76] Inventors: William S. Halliday, 12923 Lemur, Cypress, Tex. 77429; Dennis K. Clapper, 10555 Turtlewood, No. 2708, Houston, Tex. 77072

[*] Notice: This patent issued on a continued prosecution application filed under 37 CFR 1.53(d), and is subject to the twenty year patent term provisions of 35 U.S.C. 154(a)(2).

[21] Appl. No.: 641,595

[22] Filed: May 1, 1996

[51] Int. Cl.$^6$ .................................................... C09K 7/02
[52] U.S. Cl. ............................... 507/103; 507/905
[58] Field of Search ....................... 507/103, 905

[56] References Cited

U.S. PATENT DOCUMENTS

| | | | |
|---|---|---|---|
| 4,615,740 | 10/1986 | Pelezo et al. | 507/103 |
| 4,787,990 | 11/1988 | Boyd | 507/103 |
| 4,876,017 | 10/1989 | Trahan et al. | . |
| 5,045,219 | 9/1991 | Trahan et al. | . |
| 5,096,883 | 3/1992 | Mercer et al. | 507/103 |
| 5,189,012 | 2/1993 | Patel et al. | 507/103 |
| 5,333,698 | 8/1994 | Van Scyke | 175/65 |
| 5,432,152 | 7/1995 | Dawson et al. | 507/103 |
| 5,498,596 | 3/1996 | Ashjian et al. | 507/103 |
| 5,569,642 | 10/1996 | Lin | 507/103 |
| 5,589,442 | 12/1996 | Gee et al. | 507/103 |
| 5,605,879 | 2/1997 | Halliday et al. | 507/103 |
| 5,607,901 | 3/1997 | Toups, Jr. et al. | 507/103 |
| 5,627,143 | 5/1997 | Sawdon | 507/103 |
| 5,635,457 | 6/1997 | Van Slyke | 507/103 |
| 5,658,860 | 8/1997 | Clark et al. | 507/134 |

FOREIGN PATENT DOCUMENTS 2 166 782   5/1986   United Kingdom .

*Primary Examiner*—Philip Tucker
*Attorney, Agent, or Firm*—Madan & Morris, PLLC

[57] ABSTRACT

The present invention provides non-toxic, biodegradable purified paraffins which may be used as lubricants, rate of penetration enhancers, and/or spotting fluids for water-based drilling muds. When used as a spotting fluid additive, the paraffin isomers preferably are supplemented with functional additives, namely emulsifiers, viscosifiers, surfactants, and/or brine. When used as lubricants and/or rate of penetration enhancers, the paraffin isomers preferably are used alone or in combination with surfactants.

25 Claims, No Drawings

PURIFIED PARAFFINS AS LUBRICANTS, RATE OF PENETRATION ENHANCERS, AND SPOTTING FLUID ADDITIVES FOR WATER-BASED DRILLING FLUIDS

FIELD OF THE INVENTION

The present invention relates to purified paraffin additives for water-based drilling muds useful as: (a) downhole lubricants; (b) rate of penetration (ROP) enhancers; and/or, (c) spotting fluids. The additives perform the following functions, respectively: (a) prevent a drill bit from sticking in a formation; (b) enhance the penetration of a drill bit through a formation; and/or, (c) free a drill bit when it becomes lodged in a formation during drilling.

BACKGROUND OF THE INVENTION

During the drilling of oil and/or gas wells, a drill bit at the end of a rotating drill string, or at the end of a drill motor, is used to penetrate through geologic formations. During this operation, drilling mud is circulated through the drill string, out of the bit, and returned to the surface via the annular space between the drill pipe and the formation. Drilling mud serves numerous functions, including cooling and lubricating the drill string and drill bit, counterbalancing the pressures encountered in the formation using hydrostatic pressure, providing a washing action to remove the formation cuttings from the wellbore, and forming a friction reducing wall cake between the drill string and the wellbore.

During drilling, the drill string may develop unacceptable rotational torque or, in the worst case, become stuck. When this happens, the drill string cannot be raised, lowered, or rotated Common factors leading to this situation include: (1) cuttings or slough buildup in the borehole; (2) an undergauge borehole; (3) irregular borehole development embedding a section of the drill pipe into the drilling mud wall cake; and, (4) unexpected differential formation pressure.

Differential pressure sticking occurs when the drill pipe becomes embedded in the wall mud cake opposite a permeable zone. The difference between (a) the hydrostatic pressure in the drill pipe, and (b) the formation pressure holds the pipe in place, resulting in sticking pipe.

Differential sticking may be prevented, and a stuck drill bit may be freed, using an oil/mud or an oil or water based surfactant composition. Such a composition reduces friction, permeates drilling mud wall cake, destroys binding wall cake, and reduces differential pressure. Unfortunately, many of such compositions are toxic to marine life.

A continuing need exists for non-toxic additives for waterbased drilling muds which serve as lubricants, ROP enhancers, and/or spotting fluids.

SUMMARY OF THE INVENTION

The present invention provides non-toxic, biodegradable purified paraffins which may be used as lubricants, rate of penetration enhancers, and/or spotting fluids for water-based drilling muds. When used as a spotting fluid additive, the purified paraffins preferably are supplemented with functional additives, namely emulsifiers, viscosifiers, surfactants, and/or brine. When used as lubricants and/or rate of penetration enhancers, the purified paraffins preferably are used alone or, in combination with surfactants.

DETAILED DESCRIPTION OF THE INVENTION

When introduced at a certain volume downhole, the additives of the present invention act as lubricating agents and/or rate of penetration enhancers, preventing drag and torque on an operating drill pipe. When introduced at a greater volume downhole, the additives act as spotting fluids, which dislodge stuck drill pipe from the well bore.

As used herein, the term "purified paraffin" shall be defined as: (1) cycloparaffins having between about 8–28 carbon atoms, preferably between about 8–16 carbon atoms, which may have a varying general formula depending on the number of ring structures present; (2) straight or branched hydrocarbons having the following general formula:

$$C_n H_{2n+2}$$

wherein n is between about 8–28 carbon atoms, preferably between about 14–24 carbon atoms; and, (3) mixtures of (1) and (2). Regardless of their composition "purified paraffins" preferably should have a viscosity of about 8 centistokes or less at 40° C. (104° F.), most preferably between about 2–3 centistokes.

Purified paraffins may be produced from refined petroleum and purified by treatment with chemicals to remove sulfur and nitrogen-containing impurities, as well as unsaturated hydrocarbons. Purified paraffins contain little or no detectable levels of aromatics, which are removed from refined paraffins by hydrogenation. paraffins also may be produced synthetically.

Examples of purified paraffins that are useful in the present invention are commercially available white oils and other technical or food grade paraffins. Preferred purifieds paraffins are the Arco Prime™ line of white oils commercially available from Lyondell Petrochemical Company, Houston, Tex. A most preferred purified paraffin is Arco Primer™ 55, available from Lyondell. Suitable purified paraffins generally have the following properties:

| | |
|---|---|
| Gravity, API | 31.0 |
| Specific Gravity | 0.864 |
| Flash Pt. deg. F. | 275 |
| Viscosity, est. @ 40 deg. C. | 7–164 |
| Pour Pt., deg F. | −20 |
| Aniline Pt. 1, deg F. | 185 |

Preferred purified paraffins meet the applicable EPA toxicity requirements for discharge into U.S. waters.

Whether used as a lubricant, an ROP enhancer, or a spotting fluid, the purified paraffins may be supplemented with functional additives, such as emulsifiers, viscosifiers, surfactants, and/or brine. A spotting fluid blend preferably includes each of these functional additives. A lubricant or ROP enhancer preferably contains no functional additives, but may include surfactants. A combination of paraffins and any functional additives hereinafter will be called a "purified paraffin blend."

A preferred additive for use as a lubricant and/or rate of penetration enhancer (lubricant/ROP enhancer) comprises 100% of a purified paraffin. Preferred lubricant/ROP enhancers also comprise purified paraffin blends containing (1) between about 20–100% by volume, preferably between about 70–100% by volume, of purified paraffin, and (2) between about 0–80% by volume, preferably between about 0–30% by volume, of surfactant. The lubricant/ROP enhancer preferably is added to the mud pit to result in a final concentration of lubricant/ROP enhancer in the water based drilling mud of between about 1–15% by volume, preferably between about 1–2% by volume.

Generally, a spotting fluid is pumped downhole in greater quantities than a lubricant, and is used to dislodge a previously lodged bit. A preferred spotting fluid is BLACK MAGIC CLEAN, available from Baker Hughes INTEQ, which contains 50–80% by volume of Arco Prime™ 55, obtained from Lyondell, and 20–50% by volume BLACK MAGIC SACKED FISHING TOOL (SFT), available from Baker Hughes INTEQ. BLACK MAGIC SFT comprises a dry mixture of optimum-size air-blown asphalt, lime, fatty acids, and dispersants available in powdered form.

In a preferred embodiment, the purified paraffin blend for use as a spotting fluid has a concentration of between about 50–95% by volume purified paraffins and between about 5–50% by volume functional additives. More specifically, a preferred embodiment contains between about 50–95% by volume purified paraffin between about 2–6% by volume emulsifier; between about 0.2–5% by volume viscosifier; between about 2–5% by volume surfactant; and, between about 1–40% by volume brine. As a spotting fluid, the additive blend may be introduced into the mud pit, to result in a total concentration in the drilling mud of between about 1–15% by volume, more preferably between about 3–15% by volume, most preferably between about 3–5% by volume. The use of the drilling mud need not be interrupted when the paraffin is added.

The following table provides the formula and property characteristics of three lubricant additives made according to the present invention. As shown in the table, the lubricity coefficient decreases (i.e., lubrication increases) as the percentage of purified paraffin is increased. One per cent and three per cent by volume purified paraffin have been found to lubricate effectively.

| Purified Paraffin As A Water Based Lubricant: | | | |
| --- | --- | --- | --- |
| | AMOUNT | AMOUNT | AMOUNT |
| PRODUCTS | | | |
| Tapwater | .99 bbls. | .99 bbls. | .97 bbls. |
| XCD Polymer* | 1 lb/bbl | 1 lb/bbl | 1 lb/bbl |
| ARCO Prime 55 ™ | | 1% by volume | 3% by volume |
| PROPERTIES | | | |
| Density, lbs/gal | 8.4 lbs/gal | 8.4 lbs/gal | 8.4 lbs/gal |
| Lubricity Coefficient | 0.25 | 0.22 | 0.19 |

Note: Lubricity coefficients were measured using the standard, modified Timken lubricity tester for drilling fluid testing.
*XCD Polymer is a bio-polymer available from Kelco Oil Field Group, Houston, Texas.

The following table provides the formula and property characteristics of three spotting fluid additives made according to the present invention. The following materials used in the formula are available from Baker Hughes INTEQ, Houston, Tex.: CARBO-GEL (an organophilic clay); TEQ-MUL (a Polyamide Emulsifier); BIO-TEC (an oxidized tall oil emulsifier); MIL-BAR (an inorganic weighting agent); and, MIL-LIME (a lime hydrate).

| Product | Concentration |
| --- | --- |
| ARCO PRIME 55 ™, bbls | .51 |
| 25% CaCl2, bbls | .21 |
| CARBO-GEL, lbs/bbl | 3 |
| TEQ-MUL, gal/bbl | 0.50 |
| BIO-TEC, gal/bbl | 0.50 |
| MIL-BAR, lbs/bbl | 327 |
| MIL-LIME, lbs/bbl | 6 |
| Properties: | |
| Fann 600 rpm | 103 |
| Fann 300 rpm | 61 |
| 6 rpm | 12 |
| 3 rpm | 10 |
| PV, cP | 42 |
| YP, lbs/100 ft2 | 19 |
| Gels, lbs/100 ft2 | 11/14 |

Note: Typical formulation and properties of a spotting fluid composition to be used in a water based drilling fluid to help free differentially stuck pipe.

As can be seen in the following table, toxicity of a typical spotting fluid formulation using purified paraffin is well within the EPA limitation for drilling fluid toxicity.

| Product | Concentration |
| --- | --- |
| ARCO PRIME 55 ™, bbls | .6 |
| 25% CaCl2, bbls | .16 |
| CARBO-GEL, lbs/bbl | 4 |
| TEQ-MUL, gal/bbl | 1.0 |
| Toxicity Data: | |
| LC50 > 500,000 ppm | |

Note: This toxicity data was generated using the standard EPA drilling fluid toxicity protocol which entails a bioassay using mysid shrimp. The EPA limitation is 30,000 ppm.

The purified paraffins can be blended with other known drilling fluid additives such as isomerized olefins to be used for the same purpose as water based lubricants, rate of penetration enhancers, and spotting fluids. The blend may be of benefit due to economics and resulting lower viscosity. The following table gives an example of a 50—50 blend of a purified paraffin, in this case is a food grade paraffin, having a viscosity of 7.1 cSt with an isomerized olefin having a viscosity of 3.5. The resulting viscosity of 3.95 is surprisingly low because it is a non-linear reduction in viscosity.

| Chemistry | Viscosity, cSt @ 40° C. (104° F.) |
| --- | --- |
| Ester | 5.0 |
| Polyalphaolefin | 5.3 |
| Food Grade Paraffin | 7.1 |
| Isomerized Olefin | 3.5 |
| Blend (1:1) of Feed Grade Paraffin and Isomerized Olefin | 3.95 |

Persons of skill in the art will appreciate that many modifications may be made to the embodiments described herein without departing from the spirit of the present invention. Accordingly, the embodiments described herein are illustrative only and are not intended to limit the scope of the present invention.

We claim:

1. A method comprising drilling a bore through a formation using a drilling fluid comprising water as a continuous phase; and adding to said drilling fluid during said drilling a quantity of an additive comprising an amount of purified paraffins selected from the group consisting of white oils and food grade paraffins, said quantity being effective to perform a function selected from the group consisting of preventing a drill bit from sticking in a formation, enhancing penetration of a drill bit through a formation, and freeing a drill bit lodged in a formation.

2. The method of claim 1 wherein said drilling fluid is supplied to said bore via a mud pit; and said additive is added to said drilling fluid via said mud pit.

3. A method comprising adding to a drilling fluid during drilling a quantity of about 15% by volume or less of an additive comprising an amount purified paraffins selected from the group consisting of white oils and food grade paraffins, said quantity being effective to perform a function selected from the group consisting of preventing a drill bit from sticking in a formation, enhancing penetration of a drill bit through a formation, and freeing a drill bit lodged in a formation.

4. A method comprising drilling a bore through a formation using a drilling fluid comprising water as a continuous phase; and adding to said drilling fluid during said drilling a quantity of about 15% by volume or less of an additive comprising an amount of purified paraffins selected from the group consisting of white oils and food grade paraffins, said quantity being effective to perform a function selected from the group consisting of preventing a drill bit from sticking in a formation, enhancing penetration of a drill bit through a formation, and freeing a drill bit lodged in a formation.

5. The method of claim 3 wherein said drilling fluid is supplied via a mud pit; and said additive is added to said drilling fluid via said mud pit.

6. The method of claim 4 wherein p1 said drilling fluid is supplied to said bore via a mud pit; and p1 said additive is added to said drilling fluid via said mud pit.

7. A method comprising drilling a bore through a formation using a drilling fluid comprising water as a continuous phase; and adding to said drilling fluid during said drilling a quantity of about 15% by volume or less of an additive comprising an amount of purified paraffins selected from the group consisting of white oils and food grade paraffins selected from the group consisting of cycloparaffins, linear and branched paraffins comprising between about 8–28 carbon atoms, and combinations thereof, said quantity being effective to perform a function selected from the group consisting of preventing a drill bit from sticking in a formation, enhancing penetration of a drill bit through a formation, and freeing a drill bit lodged in a formation;

wherein a majority of said linear and branched paraffins comprise at least about 14 carbon atoms.

8. The method of claim 1 wherein said amount is at least about 20% by volume.

9. The method of claim 3 wherein said amount is at least about 20% by volume.

10. The method of claims 4 wherein said amount is at least about 20% by volume.

11. The method of claim 7 wherein said amount is at least about 20% by volume.

12. The method of claim 1 wherein said amount is at least about 70% by volume.

13. The method of claim 3 wherein said amount is at least about 70% by volume.

14. The method of claim 4 wherein said amount is at least about 70% by volume.

15. The method of claim 7 wherein said amount is at least about 70% by volume.

16. The method of claim 1 wherein said quantity about 5% or less by volume of said drilling fluid.

17. The method of claim 3 wherein said quantity is about 5% or less by volume of said drilling fluid.

18. The method of claim 7 wherein said quantity is about 5% or less by volume of said drilling fluid.

19. The method of claim 1 wherein said quantity is about 2% or less by volume of said drilling fluid.

20. The method of claim 3 wherein said quantity is about 2% or less by volume of said drilling fluid.

21. The method of claim 7 wherein said quantity is about 2% or less by volume of said drilling fluid.

22. The method of claim 1 wherein said additive further comprises isomerized olefins.

23. The method of claim 3 wherein said additive further comprises isomerized olefins.

24. The method of claim 4 wherein said additive further comprises isomerized olefins.

25. The method of claim 7 wherein said additive further comprises isomerized olefins.

* * * * *